(12) United States Patent
Nakamura (10) Patent No.: US 6,441,684 B1
(45) Date of Patent: Aug. 27, 2002

(54) VARIABLE GAIN AMPLIFIER SYSTEM

(75) Inventor: Katsu Nakamura, Boston, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/580,063

(22) Filed: May 30, 2000

Related U.S. Application Data (60) Provisional application No. 60/139,165, filed on Jun. 15, 1999.

(51) Int. Cl.$^7$ .................................................. H03F 1/02
(52) U.S. Cl. ........................ 330/9; 330/310; 330/254; 330/258; 327/307; 250/214 AG
(58) Field of Search ................... 330/9, 98, 258, 330/278, 310, 254; 327/307; 250/214 AG; 348/678

(56) References Cited

U.S. PATENT DOCUMENTS

| | | | | |
|---|---|---|---|---|
| 4,064,363 A | * | 12/1977 | Malm | 179/15 A |
| 5,363,055 A | * | 11/1994 | Ribner | 330/9 |
| 5,734,596 A | * | 3/1998 | Medelius | 330/295 |
| 5,757,230 A | | 5/1998 | Mangelsdorf | |
| 5,757,440 A | | 5/1998 | Mangelsdorf | |
| 6,191,715 B1 | * | 2/2001 | Fowers | 341/120 |
| 6,215,115 B1 | * | 4/2001 | Baker et al. | 250/221 |

FOREIGN PATENT DOCUMENTS

JP        6337711   *   2/1988  .................... 330/9

OTHER PUBLICATIONS

Millman, Ph.D. "Microelectronics" McGraw–Hill Book Company 1979 p. 577.*
"The Radio Amateurs Handbook" Published by The American Radio Relay League 28$^{th}$ Edition 1951 p. 65.*
Gregorian and Temes, "Analog MOS Integrated Circuits For Signal Processing," Wiley–Interscience, 1986, pp. 412–417.

* cited by examiner

Primary Examiner—Michael B Shingleton
(74) Attorney, Agent, or Firm—Wolf, Greenfield & Sacks, P.C.

(57) ABSTRACT

A CCD signal processing channel with input and output offset correction is offered. Integrators are positioned to provide correction at the input to a correlated double sampling circuit and at the output of a programmable gain amplifier. Gain control is provided for the programmable gain amplifier. The second integrator may be all digital or may combine analog and digital signals. The channel may also be constructed using a digital programmable gain amplifier. The digital programmable gain amplifier can be combined with an analog programmable gain amplifier in the signal processing channel.

21 Claims, 10 Drawing Sheets

VARIABLE GAIN AMPLIFIER SYSTEM

RELATED APPLICATION

This application claims the benefit, under 35 U.S.C. §119(e), of the filing date of provisional application Ser. No. 60/139,165, filed Jun. 15, 1999.

FIELD OF THE INVENTION

The present invention relates to a variable gain amplifier.

BACKGROUND

Figure 1:
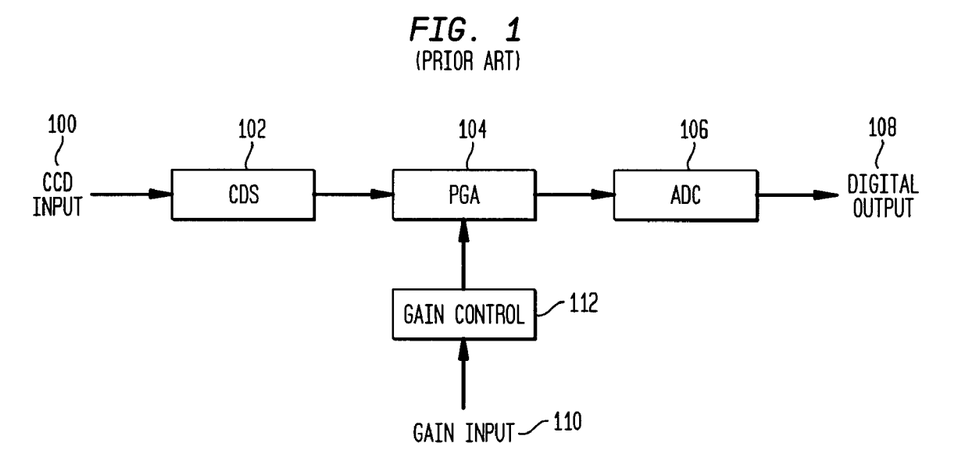
FIG. 1 shows a block diagram of a CCD signal processing channel according to the prior art.

Charge-coupled device (CCD) is the sensor of choice in modem imaging to convert photons into electrons, hence enabling the use of electronics for image processing. FIG. 1 shows typical analog front-end building blocks for a CCD signal processing channel. The CCD input signal 100 is received by a correlated double sampling circuit (CDS) 102 whose function is to extract the image content from the CCD signal 100 and remove the unwanted correlated noise component. A programmable gain amplifier (PGA) 104 amplifies the output of the CDS 102 before it gets converted to digital data by an analog-to-digital converter (ADC) 106. The gain of the PGA 104 can be programmed by providing a gain input 110 to the gain control circuit 112.

In reality, the circuit building blocks have offset, and such offset can reduce the dynamic range of the processing channel. In particular, any signal offset upstream of the PGA gets amplified by the PGA to a level related to the gain of the PGA, and hence seriously reduces the useful dynamic range of the PGA output and ADC. Such offset can come from the CCD signal, the CDS, or the input-referred offset of the PGA. For example, for an offset of 10 mV with a gain of 50× in the PGA, the output-referred offset at the output of the PGA becomes 0.5V. This reduces the dynamic range of the PGA output and ADC by 0.5V, which is not acceptable in most integrated circuit design applications.

Figure 2:
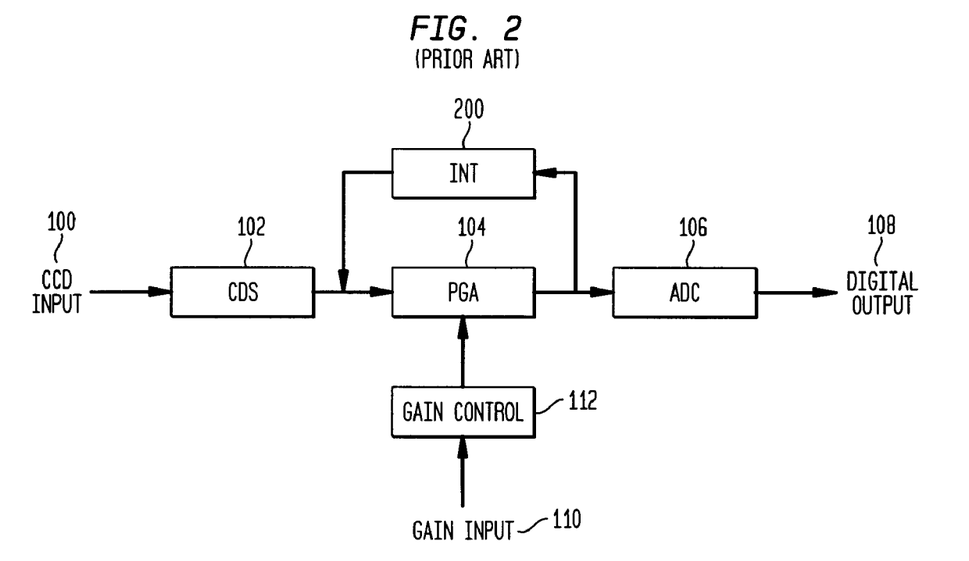
FIG. 2 shows a block diagram of a CCD signal processing channel with offset correction according to the prior art.

In order to address this problem, an offset correction is typically used. One way to provide an offset correction is to integrate the output of the PGA during the calibration interval (e.g., black pixel period) and subtract the accumulated error from the input of the PGA in a feedback fashion. The feedback adjusts the input of the PGA such that the output of the PGA is equal to the system's "zero" reference during CCD's black pixels. This scheme is shown in FIG. 2. In this figure, INT 200 refers to an integrator.

One problem with the scheme of FIG. 2 is that the time constant of the loop (PGA 104 and INT 200 loop) depends on the gain of the PGA 104. To keep the feedback loop stable and the noise of the "zero" reference low, the bandwidth of the loop must be kept low and constant, keeping the loop gain constant with the varying PGA gain. This can be accomplished by inserting another PGA in the feedback path with a reciprocal gain characteristic of the PGA in the forward path. We call this a reverse PGA (RPGA) 300, which is shown in FIG. 3.

Figure 3:
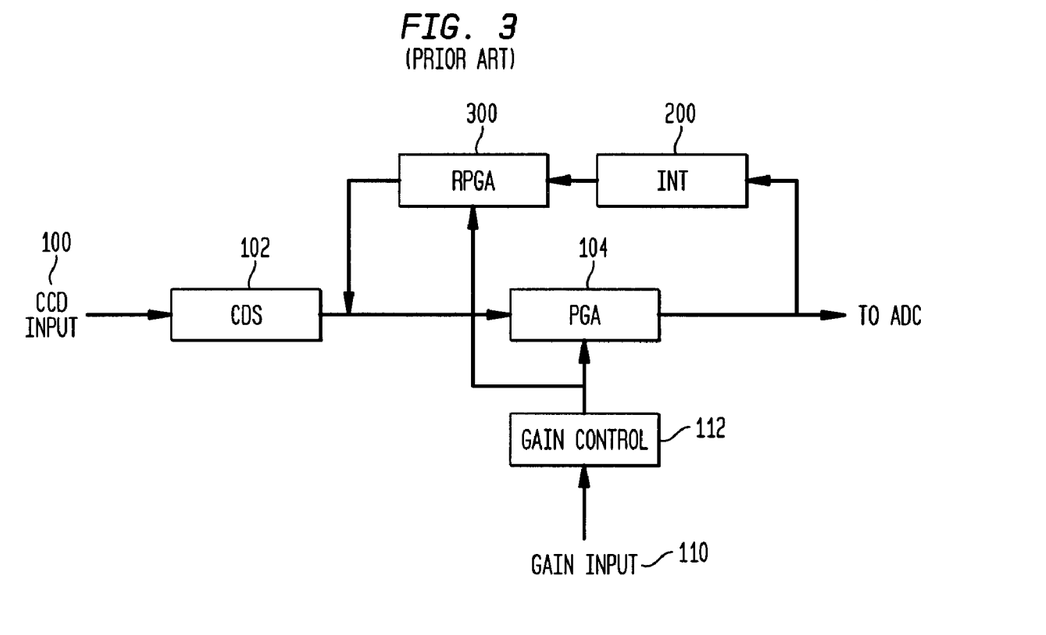
FIG. 3 shows a block diagram of a CCD signal processing channel with offset correction and constant loop gain according to the prior art.
Figure 4:
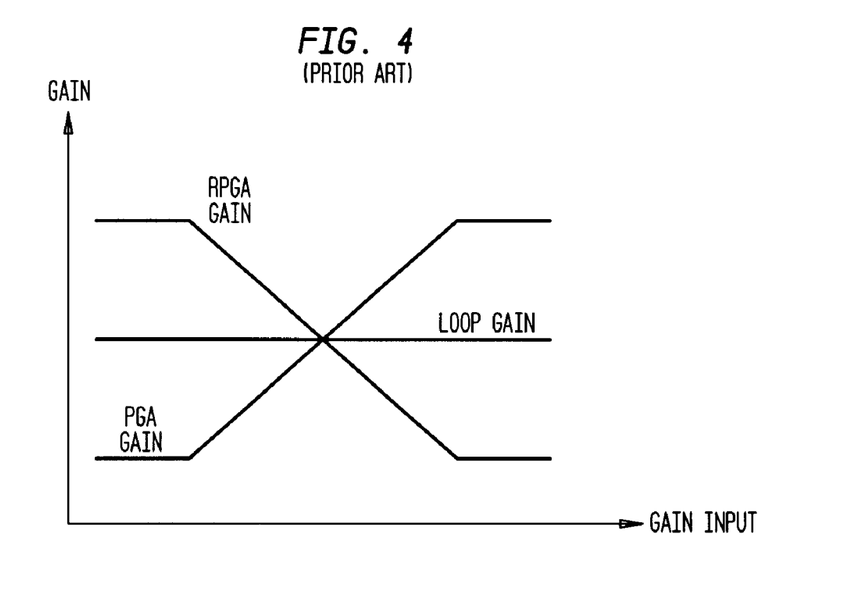
FIG. 4 shows the PGA, RPGA, and loop gain characteristic of the circuit shown in FIG. 3 according to the prior art.

The gain characteristics of the PGA, the RPGA and the loop are shown in the diagrams of FIG. 4. The PGA gain, the RPGA gain and the loop gain are each shown with respect to input gain. In terms of the dynamics of the loop, the order of RPGA 300 and INT 200 in the feedback path does not matter. The RPGA 300 can come before the INT 200 in the feedback path of the loop. There are, however, circuit level consequences that make the implementation of FIG. 3 a preferred embodiment.

SUMMARY

There are two limitations with the implementations of FIGS. 2–3. First, INT 200 must have a large enough output range to handle any offset before PGA 104. Note that the offset correction removes the offset from the output of the PGA 104; this correction is accomplished by INT's 200 providing the same offset (with opposite polarity) in the feedback loop. This can be a problem in a low supply (e.g., <3.0V) voltage environment. Second, PGA 104 must have a wide gain control range. Many CCD camera applications require a gain range of up to 40 dB (100×) with a maximum gain of 40 dB. This requires the PGA 104 to have an adequate bandwidth at the maximum gain, which increases the circuit's size and power consumption. The circuit of FIG. 3 is particularly vulnerable to size and power consumption increases due to its use of two PGA blocks.

To avoid the limitations of the prior art, a CCD signal processing channel with split offset correction is offered. Dual integrators are used to correct offset from the CCD input to the digital output. One integrator is placed at the correlated double sampling circuit to remove the CCD's offset as well as the CDS's offset. A second integrator is placed after the PGA to remove the PGA's offset as well as any uncorrected offset from the first offset correction. In an alternate embodiment, the second integrator can be placed after an analog digital converter (ADC) so that the integrator can operate entirely digitally. Alternatively, a digital PGA can be used in the channel. The signal from the CDS is converted by the ADC before it reaches the PGA and a digital PGA (DPGA) is used to produce a digital output. In an alternate embodiment, an analog PGA is used in combination with a DPGA. An ADC is placed at the output of the PGA which then provides the input for the digital DPGA. In this embodiment, gain control is offered for both the PGA and DPGA.

In the dual PGA, dual offset correction embodiment the first integrator is positioned at the correlated double sampling circuit and the second integrator is either positioned at the output of the PGA or at the output of the analog to digital converter.

In one embodiment, a pixel gain amplifier is used in combination with the CDS.

DETAILED DESCRIPTION

Figure 5:
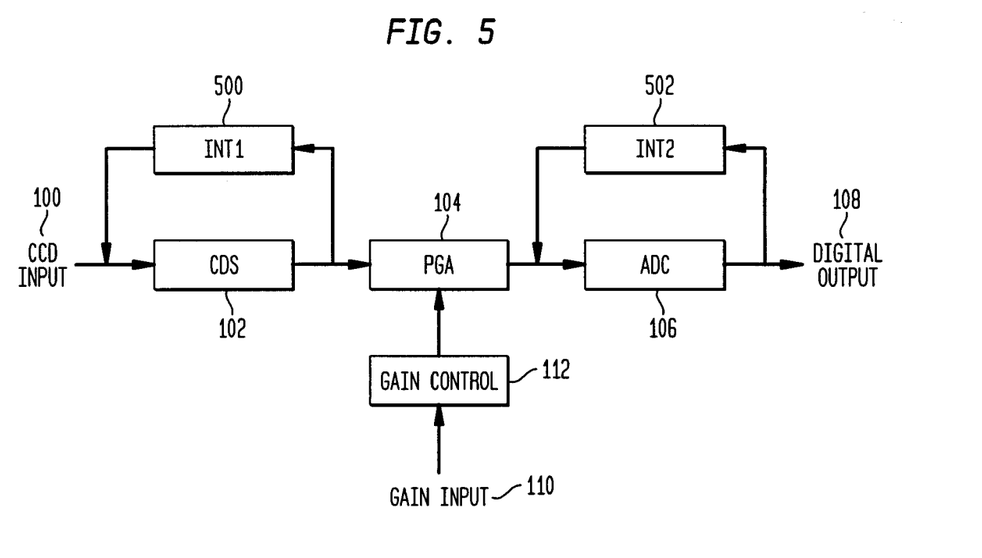
FIG. 5 shows a block diagram of a CCD signal processing channel with input and output offset corrections.

FIG. 5 shows a scheme to address the INT's output range limitation. In this scheme, two offset correction loops are applied: one to the input 500 and the other to the output 502 of the PGA block 104. The input offset correction removes the CCD's offset as well as the CDS's offset. The output offset-correction then removes the PGA's input offset plus the uncorrected offset from the first offset correction, referred to the PGA's output. Since most of the offset contributions are removed before the PGA, the offset that the output offset loop must correct for becomes significantly less compared to the prior art implementations of FIGS. 2 and 3. This is advantageous since it lends to circuit simplification. The input offset correction is accomplished by integrating the output of the CDS 102 during a calibration interval (e.g., black pixel period) and subtracting the accumulated error from the input of the CDS 102 in a feedback. The feedback adjusts the input of the CDS 102 such that the output of the CDS 102 is equal to the "zero" signal level during CCD's black pixels. The output offset-correction is accomplished by integrating the output of the ADC and subtracting the accumulated error from the output of the PGA 104 in a feedback. The feedback adjusts the output of the PGA 104 such that the output of the ADC 106 is equal to the system's "zero" reference during CCD's black pixels.

Figure 6:
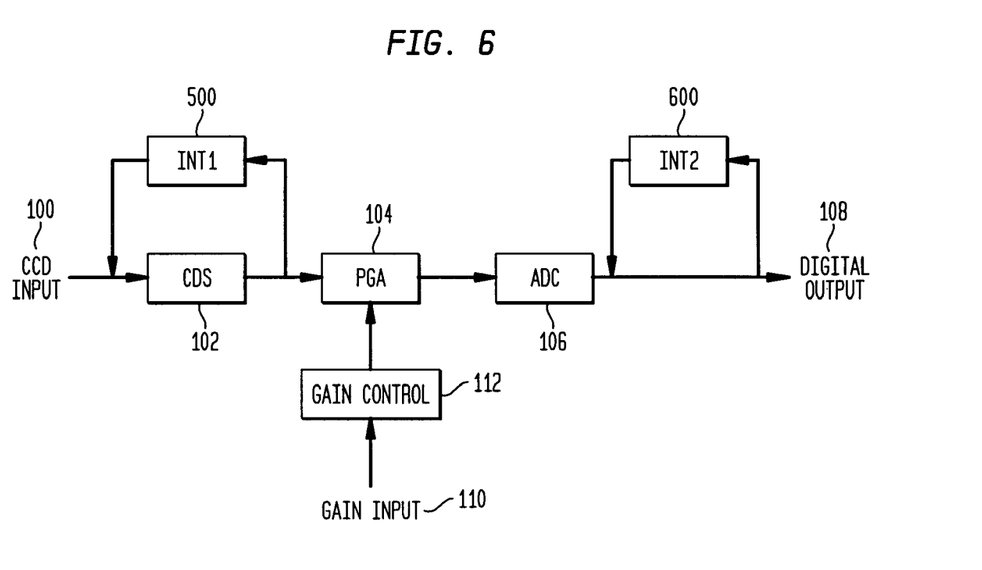
FIG. 6 shows a block diagram of one embodiment of a CCD signal processing channel with input and output offset correction.

FIG. 6 shows another embodiment of the concept of FIG. 5. In this implementation, the output offset correction is done digitally. The correction loop integrates the output of the ADC 106 and subtracts the error from the output of the ADC 106. The difference between the implementations of FIG. 5 and FIG. 6 is that the input of INT 2 502 in FIG. 5 must be the digital output of the ADC 106, but the output of INT 502 must be an analog level. In a real implementation of FIG. 5, there must be a digital to analog converter (DAC) with an appropriate level of resolution in the feedback with an INT 2 502. Because INT 2 600 in FIG. 6 deals only with digital signals, no converters need to be added to its implementation.

Figure 7:
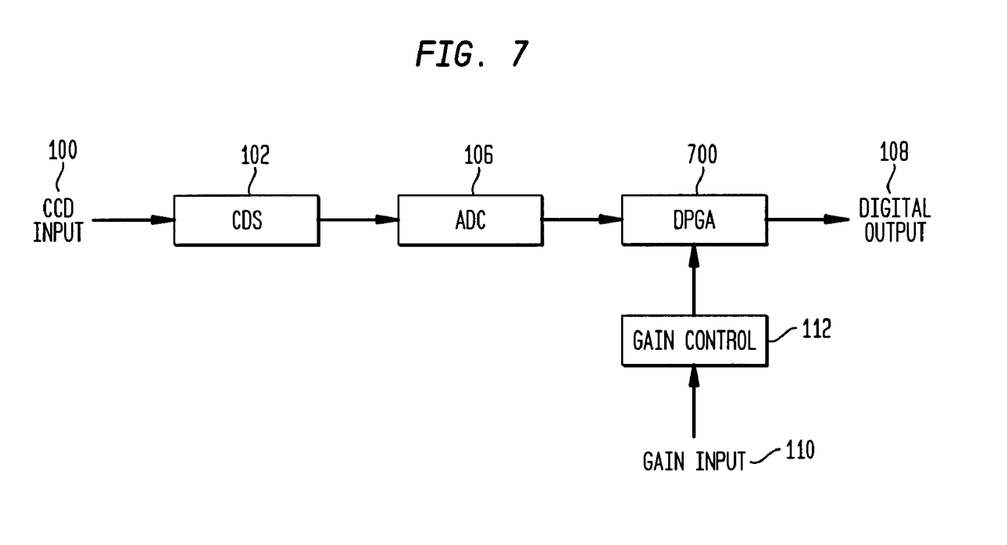
FIG. 7 shows a block diagram of a CCD signal processing channel using a digital PGA.

FIG. 7 shows a scheme to address the limitation with the large gain range of PGAs. In this scheme, the PGA stage 700 is moved to after the ADC 106. By doing so, the implementation of the PGA becomes digital (i.e., digital multiplier), hence resulting in circuit simplification. We also refer to this as digital-PGA or simply DPGA 700. The drawback of the DPGA 700 is a loss in the signal's dynamic range with digital gain due to the truncation inherent in a digital multiplier. For example, an increase in digital gain by 2× (or 6 dB) is accompanied by a reduction in the dynamic range by 2× (or 6 dB). To offset this effect, the resolution of the ADC 106 needs to be increased by the gain range used in the DPGA 700. For example, to obtain the same dynamic range as the analog PGA with 36 dB gain-range, the resolution of the ADC must be increased by 6 bits using a DPGA with the same gain range. Such an increase in resolution can be a more costly solution due to the difficulty of achieving 6 additional bits in the ADC.

Figure 8:
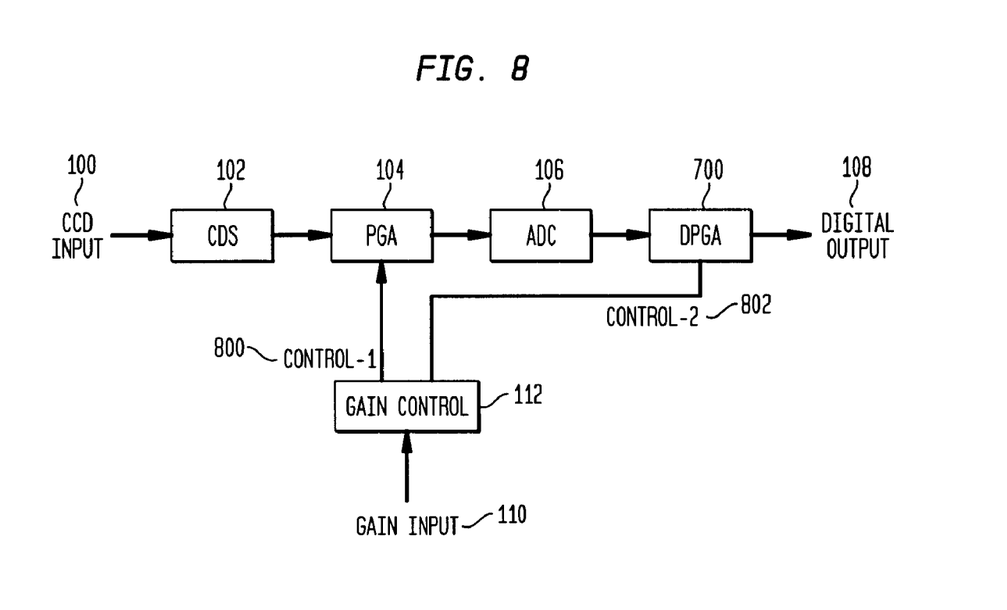
FIG. 8 shows a block diagram of a CCD signal processing channel using analog PGA and digital PGA.

FIG. 8 shows another embodiment using DPGA. In the scheme of FIG. 8, a DPGA 700 is used in conjunction with an analog PGA 104 to achieve the required gain range. The PGA 104 provides the lower gain range where the channel noise is limited by the ADC 106 (or noise after the gain of the PGA), and the DPGA 700 provides the higher gain range where the channel noise is limited by the input noise (or, noise before the gain of the PGA).

Figure 9:
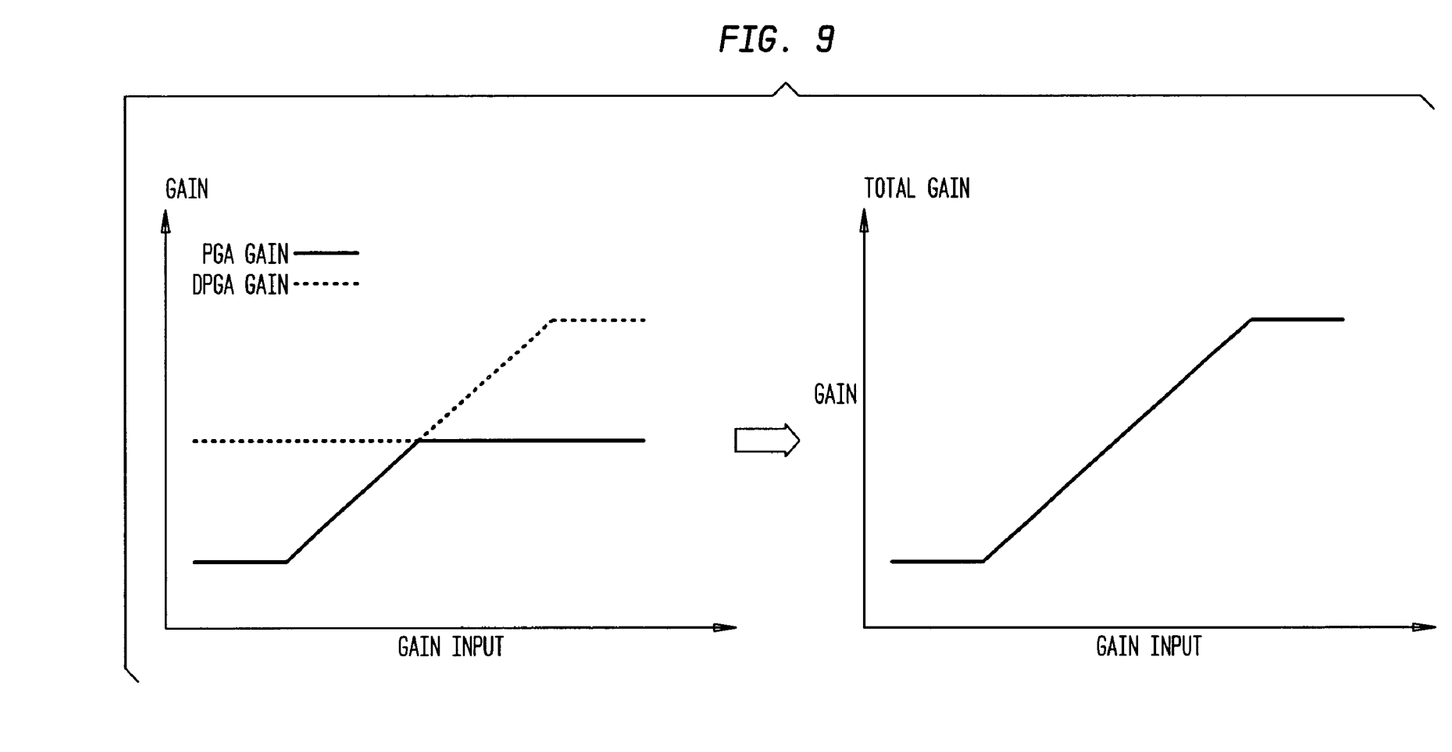
FIG. 9 shows the PGA and DPGA gain characteristics of the circuit shown in FIG. 8.

FIG. 9 shows the gain curves of PGA, DPGA, and overall gains. As shown, the gain range covered by the PGA is smaller compared to the all-analog implementation with the same total gain range (FIG. 1), hence lending to a simpler PGA design. By the same token, the DPGA covers a smaller gain range compared to the full digital implementation (FIG. 7). Here, the required resolution of the ADC can be less, and again simplifies the ADC design compared to that of FIG. 7. This hybrid analog-digital PGA solution has the most potential for achieving the overall design simplification compared to FIG. 1 and FIG. 7.

Figure 10:
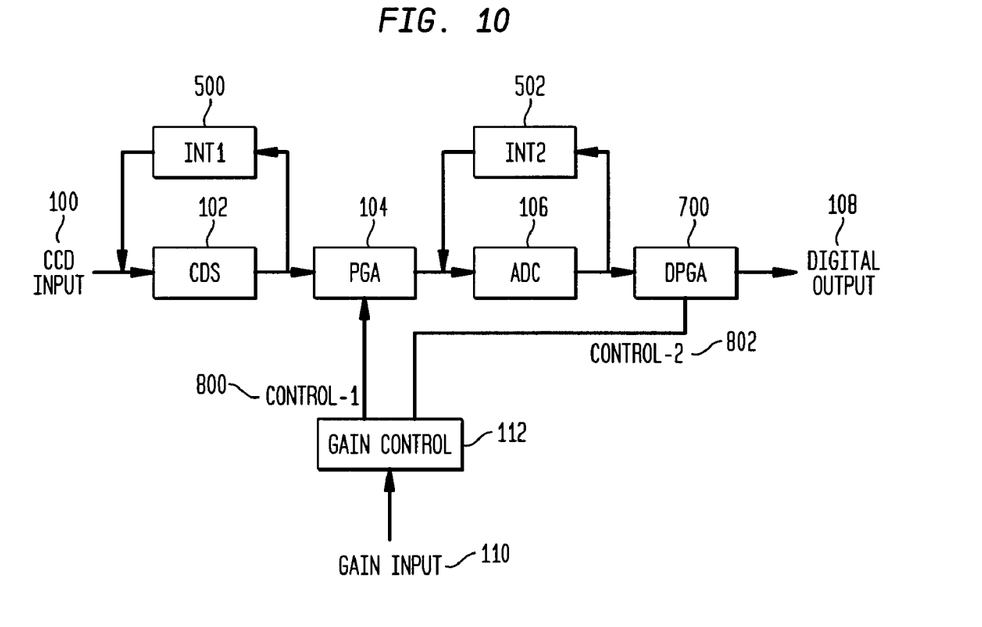
FIG. 10 shows a block diagram of a CCD signal processing channel using analog PGA and digital PGA with offset correction.
Figure 11:
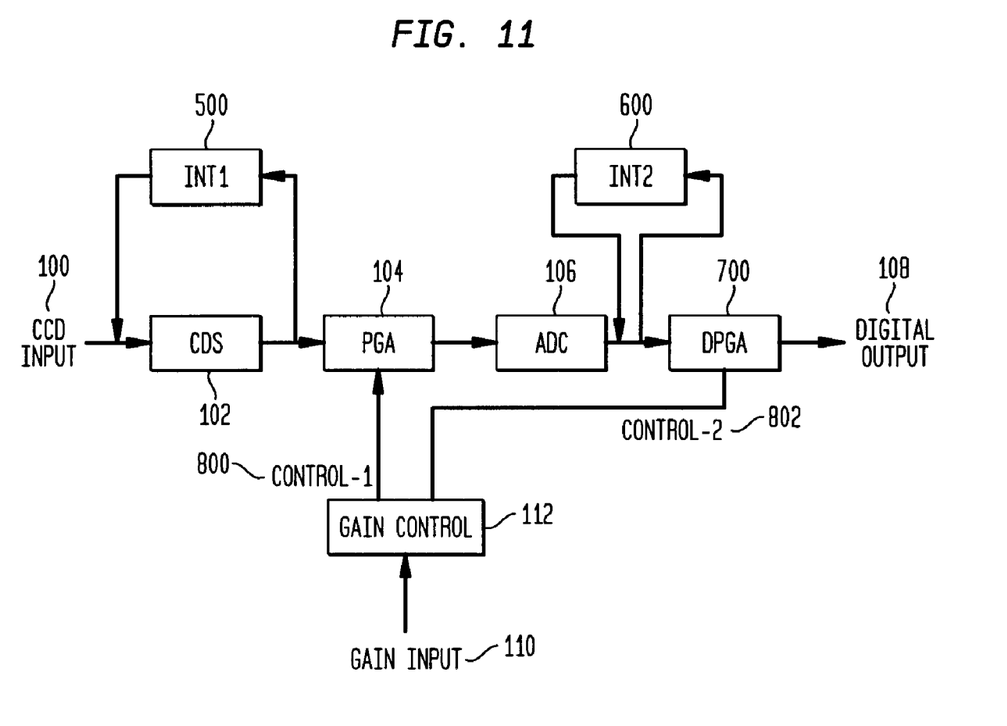
FIG. 11 shows a block diagram of one embodiment of a CCD signal processing channel using analog PGA and digital PGA with offset correction.

FIGS. 10–11 shows how input and output offset correction can be used with the embodiment of FIG. 8. FIG. 10 shows the signal processing channel of FIG. 8 with two integrators, 500 and 502. The first integrator 500 removes the CCD's offset as well as the CDS's offset. The second integrator 502 removes the PGA's input offset plus the uncorrected offset from the first offset correction, referred to the PGA's output. The channel of FIG. 11 moves the second integrator 600 past the ADC in the channel, thereby performing all corrections in the digital domain as described above for FIG. 6.

Figure 12:
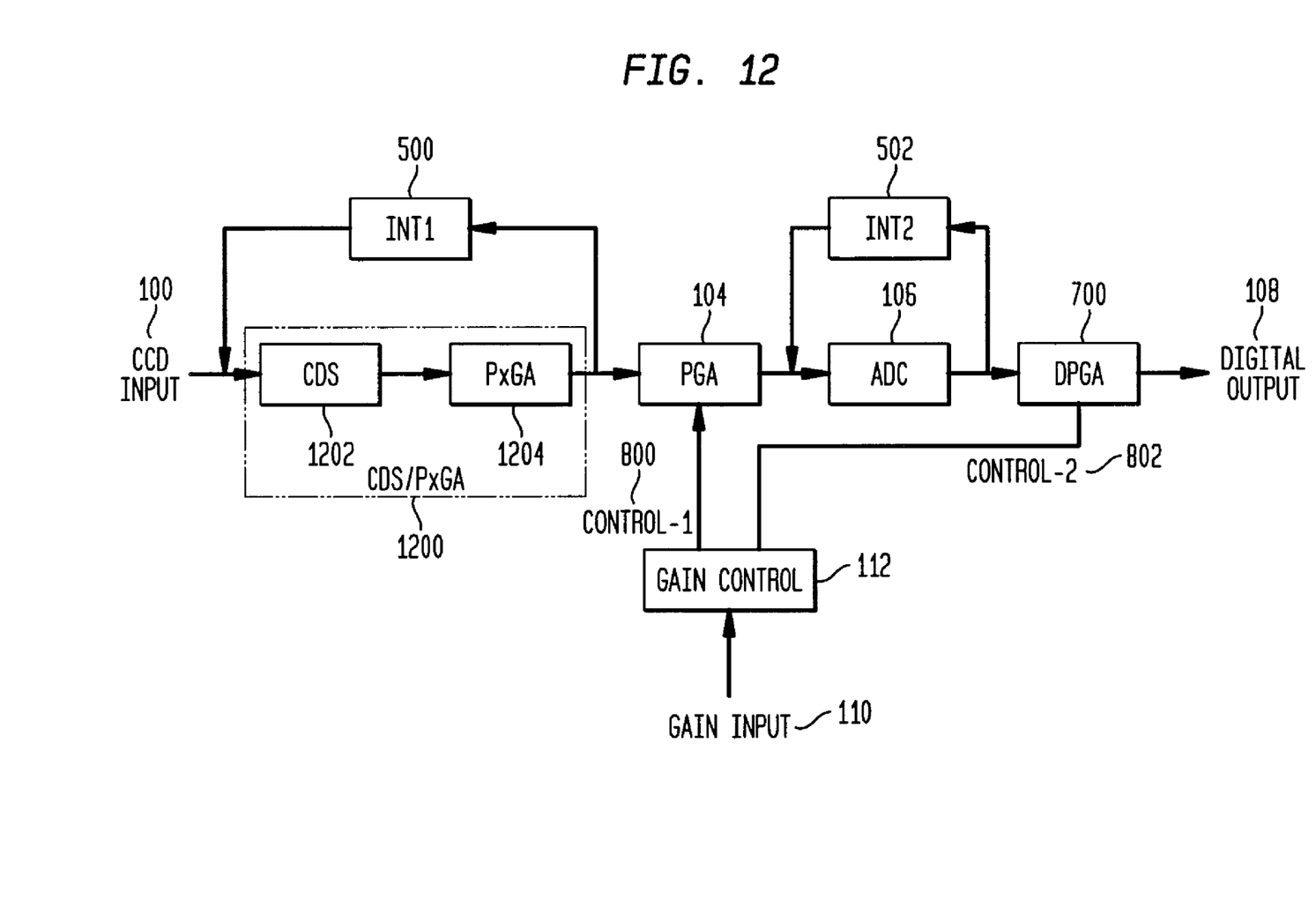
FIG. 12 shows a block diagram of a CCD signal processing channel using analog PGA, digital PGA and a pixel gain amplifier with offset correction.
Figure 13:
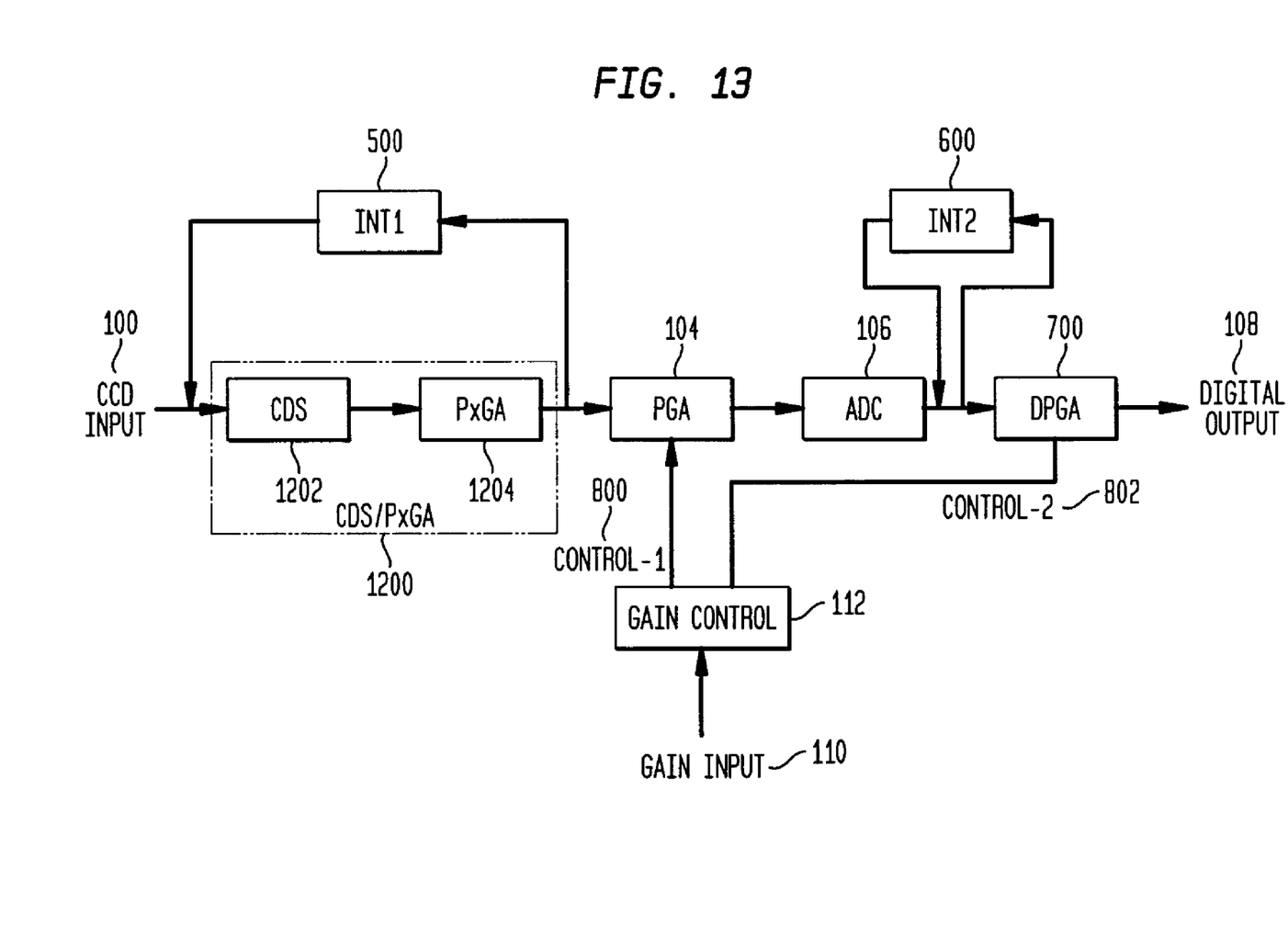
FIG. 13 shows a block diagram of one embodiment of a CCD signal processing channel using analog PGA, digital PGA and a pixel gain amplifier with offset correction.
Figure 14:
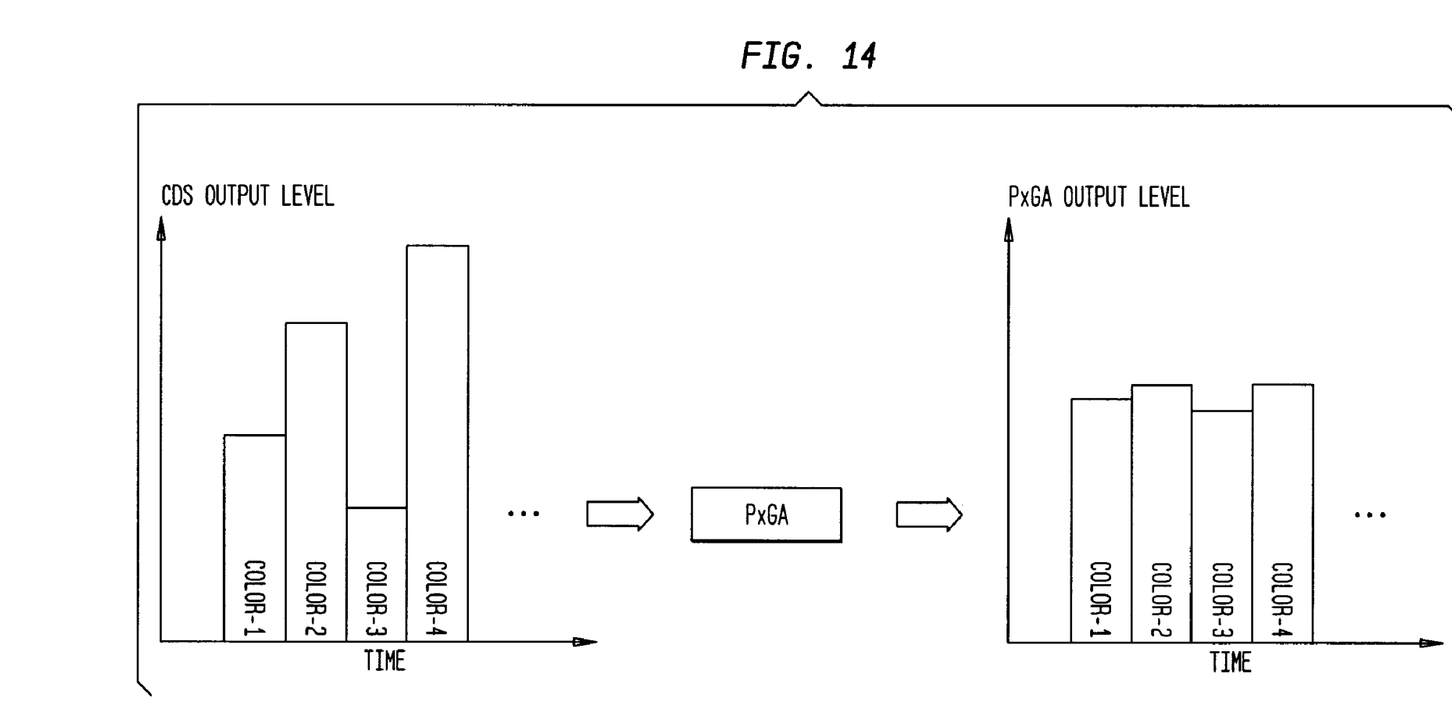
FIG. 14 shows the output level of the pixel gain amplifier as shown in FIG. 13.

FIGS. 12–13 show two embodiments using a pixel-gain-amplifier (P×GA) 1204. P×GA 1204 provides gains switchable from sample to sample, and the concept is illustrated in FIG. 14. The idea behind P×GA is to provide gains based on pixels in order to equalize the responsiveness of different samples corresponding to different colors produced by CCD sensors. FIGS. 12–13 show how the P×GA block 1200 can be implemented in the signal processing chain with input and output offset correction, and PGA 104 and DPGA 700. The invention of the P×GA is disclosed separately in a concurrently filed application. This application, entitled "Pixel Gain Amplifier," was filed on even date herewith and claims priority to provisional application Ser. No. 60/138,960, filed Jun. 11, 1999. Provisional application Ser. No. 60/138,960 is herein incorporated by reference in its entirety, and a copy of the corresponding non-provisional application is enclosed herewith.

This invention can be applied to processing of other types of signals, and is not limited to the processing of CCD signal.

Having thus described at least one illustrative embodiment of the invention, various alterations, modifications and improvements will readily occur to those skilled in the art. Such alterations, modifications and improvements are intended to be within the spirit of the invention. Accordingly, the foregoing description is by way of example only and is not intended as limiting. The invention is limited only as defined in the following claims and the equivalents thereto.

What is claimed is:

1. A variable gain amplifier circuit comprising:
   a programmable gain amplifier having an input and an output;
   a first offset correction circuit, that provides a first offset correction, coupled to the input of the programmable gain amplifier;
   a second offset correction circuit, that provides a second offset correction, coupled to the output of the programmable gain amplifier; and an analog-to-digital converter, coupled to the output of the programmable gain amplifier, wherein the second offset correction circuit is connected in feedback around the analog-to-digital converter.

2. A variable gain amplifier circuit as claimed in claim 1, further comprising a gain control circuit coupled to the programmable gain amplifier.

3. A variable gain amplifier circuit as claimed in claim 2, further comprising a gain input coupled to the gain control circuit.

4. A variable gain amplifier circuit as claimed in claim 1, wherein the variable gain amplifier circuit receives an input signal from an image sensor.

5. A variable gain amplifier circuit as claimed in claim 4, wherein the image sensor is a CCD.

6. A variable gain amplifier circuit as claimed in claim 1, further comprising a gain control circuit coupled to the programmable gain amplifier.

7. A variable gain amplifier circuit as claimed in claim 6, further comprising a gain input coupled to the gain control circuit.

8. A variable gain amplifier circuit comprising:
an analog-to-digital converter receiving an analog input and providing a digital output;
a first programmable gain amplifier coupled to the output of the analog-to-digital converter and in a digital domain of the variable gain amplifier circuit;
second programmable gain amplifier coupled to the input of the analog-to-digital converter in an analog domain of the variable gain amplifier;
a first offset correction circuit, that provides a first offset correction, coupled to an input of the second programmable gain amplifier and a second offset correction circuit, that provides a second offset correction, coupled to an output of the second programmable gain amplifier; and
a pixel gain amplifier coupled to the input of the first programmable gain amplifier.

9. A variable gain amplifier circuit as claimed in claim 8, further comprising a gain control circuit.

10. A variable gain amplifier circuit as claimed in claim 9, further comprising a gain input coupled to the gain control circuit.

11. A variable gain amplifier circuit as claimed in claim 8, further comprising a gain control circuit coupled to both the first programmable gain amplifier and to the second programmable gain amplifier.

12. A variable gain amplifier circuit as claimed in claim 8, wherein the second offset correction circuit comprises an integrator connected in series with a digital-to-analog converter.

13. A method for offset correction in a variable gain amplifier circuit comprising:
receiving an input signal from an input signal source;
feeding back a first offset correction signal to provide a first offset correction using a first offset correction circuit coupled to an input of a programmable gain amplifier;
feeding back a second offset correction signal using a second offset correction circuit coupled to an output of the programmable gain amplifier to provide a second offset correction; and
converting an analog signal from the output of the programmable gain amplifier to a digital signal using an analog-to-digital converter, and wherein the feeding back is done entirely in a digital domain of the variable gain amplifier circuit.

14. A variable gain amplifier circuit comprising:
a programmable gain amplifier having an input and an output;
a first offset correction circuit, that provides a first offset correction, coupled to the input of the programmable gain amplifier; and
a second offset correction circuit, that provides a second offset correction, coupled to the output of the programmable gain amplifier;
wherein the second offset correction circuit comprises an integrator in series with a digital-to-analog converter.

15. A method for offset correction in a variable gain amplifier circuit comprising:
receiving an input signal from an input signal source;
feeding back a first offset correction signal to provide a first offset correction using a first offset correction circuit coupled to an input of a programmable gain amplifier;
feeding back a second offset correction signal using a second offset correction circuit coupled to an output of the programmable gain amplifier to provide a second offset correction; and
converting an analog signal from the output of the programmable gain amplifier to a digital signal using an analog-to-digital converter, and wherein the feeding back of the second offset correction signal is performed around the analog-to-digital converter.

16. A variable gain amplifier circuit comprising:
an analog-to-digital converter receiving an analog input and providing a digital output;
a first programmable gain amplifier coupled to the output of the analog-to-digital converter and in a digital domain of the variable gain amplifier circuit;
second programmable gain amplifier coupled to the input of the analog-to-digital converter in an analog domain of the variable gain amplifier; and
a first offset correction circuit, that provides a first offset correction, coupled to an input of the second programmable gain amplifier and a second offset correction circuit, that provides a second offset correction, coupled to an output of the second programmable gain amplifier;
wherein a responsiveness of different samples corresponding to different colors produced by an image sensor is equalized by an equalizer.

17. A variable gain amplifier circuit comprising:
a programmable gain amplifier having an input and an output;
a first offset correction circuit, that provides a first offset correction, coupled to the input of the programmable gain amplifier;
a second offset correction circuit, that provides a second offset correction, coupled to the output of the programmable gain amplifier;
wherein the second offset correction circuit comprises an integrator in series with a digital-to-analog converter; and
a correlated double sampling circuit having an output coupled to the analog-to-digital converter.

18. A variable gain amplifier circuit as claimed in claim 17, wherein the correlated double-sampling circuit receives an input from an image sensor.

19. A variable gain amplifier circuit as claimed in claim 18, wherein the image sensor is a CCD.

20. A variable gain amplifier circuit as claimed in claim 11, further comprising a gain input coupled to the gain control circuit.

21. A variable gain amplifier circuit comprising:

an analog-to-digital converter receiving an analog input and providing a digital output;

a first programmable gain amplifier coupled to the output of the analog-to-digital converter and in a digital domain of the variable gain amplifier circuit;

second programmable gain amplifier coupled to the input of the analog-to-digital converter in an analog domain of the variable gain amplifier; and a first offset correction circuit, that provides a first offset correction, coupled to an input of the second programmable gain amplifier and a second offset correction circuit, that provides a second offset correction, coupled to an output of the second programmable gain amplifier and to the output of the analog-to-digital converter in a digital domain of the variable gain amplifier circuit.

* * * * *